US008897933B1

(12) United States Patent
Teller et al.

(10) Patent No.: US 8,897,933 B1
(45) Date of Patent: Nov. 25, 2014

(54) BATTERY FLYWHEEL FOR A HIGH-ALTITUDE BALLOON

(75) Inventors: Eric Teller, San Francisco, CA (US); Richard Wayne DeVaul, Mountain View, CA (US); Clifford L. Biffle, Berkeley, CA (US)

(73) Assignee: Google Inc., Mountain View, CA (US)

(*) Notice: Subject to any disclaimer, the term of this patent is extended or adjusted under 35 U.S.C. 154(b) by 213 days.

(21) Appl. No.: 13/470,889

(22) Filed: May 14, 2012

(51) Int. Cl.
*G05D 1/00* (2006.01)

(52) U.S. Cl.
USPC .................................. 701/4; 701/15; 701/16

(58) Field of Classification Search
CPC ........................................................ G01C 23/00
USPC .............................................................. 701/4
See application file for complete search history.

(56) References Cited

U.S. PATENT DOCUMENTS

| 4,732,353 | A | 3/1988 | Studer |
| 5,660,356 | A | 8/1997 | Selfors et al. |
| 6,388,347 | B1 * | 5/2002 | Blake et al. ...................... 310/74 |
| 2007/0063099 | A1 | 3/2007 | Holloman, Jr. |
| 2008/0308685 | A1 * | 12/2008 | Decker ........................ 244/53 R |

FOREIGN PATENT DOCUMENTS

FR 2128177 10/1972

* cited by examiner

*Primary Examiner* — Thomas G Black
*Assistant Examiner* — Luke Huynh
(74) *Attorney, Agent, or Firm* — McDonnell Boehnen Hulbert & Berghoff LLP

(57) ABSTRACT

Methods and systems disclosed herein relate to using a rotating flywheel battery in a balloon in a high-altitude balloon network. An example method could include converting, in a balloon, first electrical energy into kinetic mechanical energy. The balloon includes a flywheel battery configured to rotate about a spin axis. The kinetic mechanical energy includes a rotation motion of the flywheel battery. The method could further include storing the kinetic mechanical energy for a finite period of time. Further, the method could include performing, using the flywheel battery, at least one of: i) converting at least a portion of the stored kinetic mechanical energy into second electrical energy; ii) stabilizing at least one motion of the balloon based on the rotational motion of the flywheel battery; and iii) rotating the balloon substantially about a balloon axis substantially perpendicular to the ground surface of the earth.

26 Claims, 11 Drawing Sheets

BATTERY FLYWHEEL FOR A HIGH-ALTITUDE BALLOON

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In a first aspect, a method is provided. The method includes converting, in a balloon, first electrical energy into kinetic mechanical energy. The balloon includes a flywheel battery configured to rotate about a spin axis substantially parallel to a ground surface of the earth. The kinetic mechanical energy includes a rotational motion of the flywheel battery. The method also includes storing, using the rotational motion of the flywheel battery, the kinetic mechanical energy for a finite period of time. The method additionally includes performing, using the flywheel battery, at least one of: i) converting at least a portion of the stored kinetic mechanical energy into second electrical energy; ii) stabilizing at least one motion of the balloon based on the rotational motion of the flywheel battery; and iii) rotating the balloon substantially about a balloon axis substantially perpendicular to the ground surface of the earth.

In a second aspect, a flywheel battery is provided. The flywheel battery includes a shaft that defines a spin axis, a rotor mechanically coupled to the shaft, and a mount mechanically coupled to a balloon. The rotor is configured to rotate about the spin axis. The rotor includes at least one battery configured to store electrical energy. The rotation of the rotor about the spin axis includes kinetic mechanical energy. The mount includes at least one stator.

In a third aspect, a non-transitory computer readable medium having stored instructions is provided. The instructions are executable by a computing device to cause the computing device to perform functions. The functions include causing a system to convert, in a balloon, first electrical energy into kinetic mechanical energy. The balloon includes a flywheel battery configured to rotate about a spin axis substantially parallel to a ground surface of the earth. The kinetic mechanical energy includes a rotational motion of the flywheel battery. The functions further include causing the flywheel battery to store, using the rotational motion of the flywheel battery, the kinetic mechanical energy for a finite period of time. The functions yet further include causing the flywheel battery to perform at least one of: i) converting at least a portion of the stored kinetic mechanical energy into second electrical energy; ii) stabilizing at least one motion of the balloon based on the rotational motion of the flywheel battery; and iii) rotating the balloon substantially about a balloon axis substantially perpendicular to the ground surface of the earth.

In a fourth aspect, a method is provided. The method includes rotating a flywheel about a spin axis. The flywheel is mechanically coupled to a balloon payload. The balloon payload includes an optical-communication component. The optical-communication component has a current pointing axis. The optical-communication component is operable to communicate with a correspondent device via a free-space optical link. The method also includes determining an updated pointing axis so as to maintain the free-space optical link. The method further includes determining a corrective gyroscopic torque so as to change the current pointing axis to the updated pointing axis. The method additionally includes generating the corrective gyroscopic torque by changing the spin axis and enabling the balloon payload to move in response to the corrective gyroscopic torque.

In a fifth aspect, a device is provided. The device includes a mount and a battery. The battery is mechanically coupled to the mount such that the battery is configured to rotate about a spin axis. The battery is configured to store electrical energy.

These as well as other aspects, advantages, and alternatives, will become apparent to those of ordinary skill in the art by reading the following detailed description, with reference where appropriate to the accompanying drawings.

DETAILED DESCRIPTION

Figure 1:
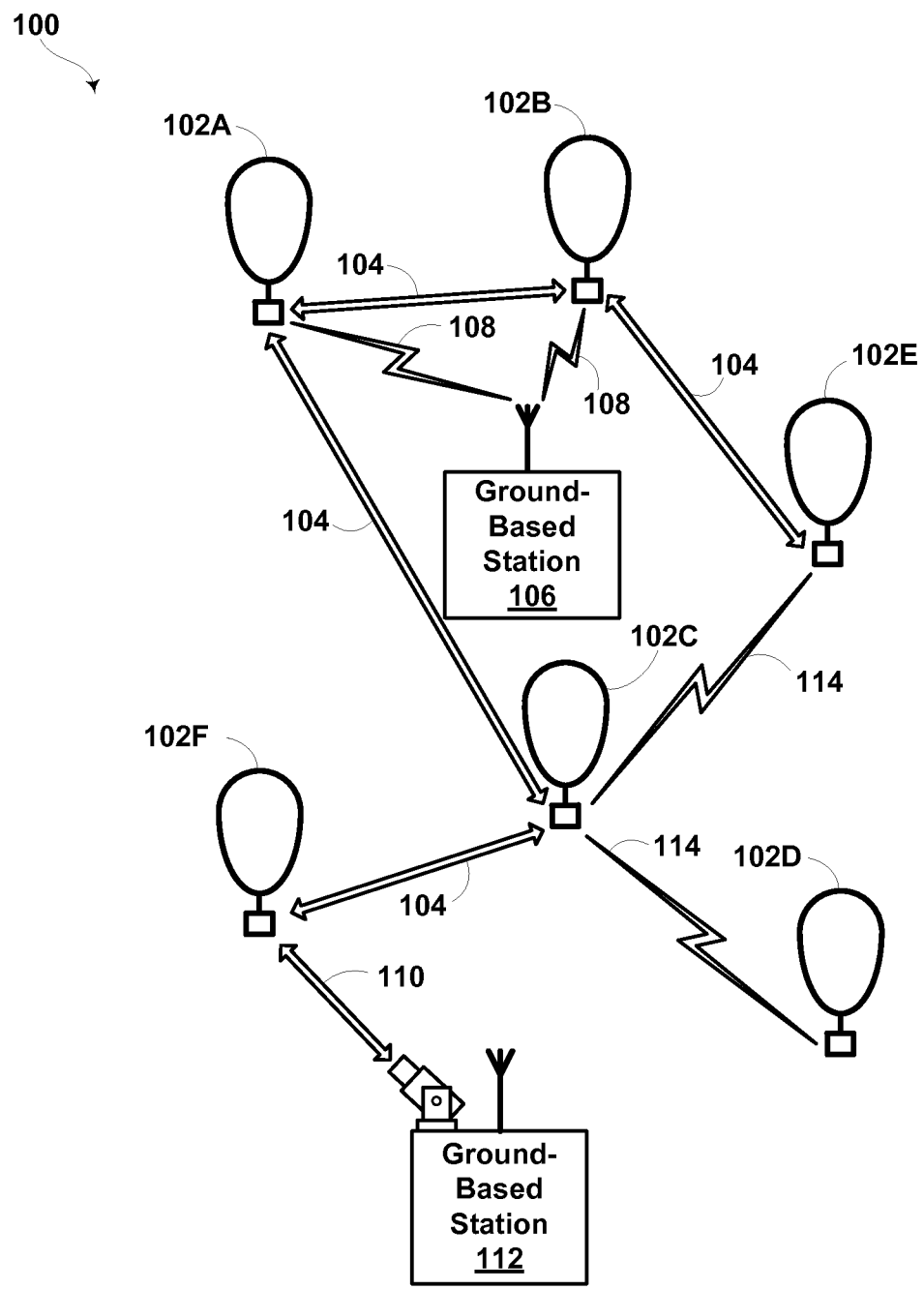
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments disclosed herein relate to rotating a battery at a predetermined angular velocity about a spin axis. The battery is mechanically and electrically coupled to a device, such as a balloon in a high-altitude balloon network. The battery is configured to: i) be charged with electrical energy; ii) store at least a first portion of the electrical energy; and iii) provide at least a second portion of the electrical energy to at least a portion of the device. Tilting the spin axis could generate a gyroscopic torque and the device could be moved and/or stabilized based on the gyroscopic torque.

In other words, a balloon in a high-altitude balloon network could be powered fully or in part by a battery. The battery could be a lithium-ion battery, among other possibilities. The battery may be rechargeable using solar panels or other energy sources. By rotating the battery about a spin axis, kinetic mechanical energy can be stored as well as electrical energy. The kinetic mechanical energy could be stored (by maintaining the angular velocity of the battery) and/or converted to electrical energy.

Additionally, the spinning battery could be used as a gyroscope. If the spinning battery has a spin axis parallel to the ground surface of the earth, rotational movements of the balloon may be stabilized or lessened. In such a way, onboard free-space optical communication components could be more reliably aligned with ground-, air-, and/or space-based communication platforms.

Further, the spinning battery could be used to rotate the balloon. In an example embodiment, the battery could be mechanically mounted to the balloon with a gimbal mount. By turning the gimbal mount with respect to the balloon, the balloon may rotate about a balloon axis, which could be perpendicular to the ground surface of the earth. Such rotations could aid in orientating free-space optical communication components with another balloon or communications platform.

Methods disclosed herein could be carried out in part or in full by the one or more balloons in the high-altitude balloon network. Alternatively, some or all of the steps of the methods herein could be carried out in part or in full by a computer system or a server network.

It will be understood that the system could include more or fewer elements than those disclosed herein. Further the elements of the system could be configured and/or be operable to perform more or fewer functions within the context of the present disclosure.

In some embodiments, each of the elements of the system could be incorporated into at least one balloon in a high-altitude balloon network. In other embodiments, some or all of the elements of the system may be located apart from other elements of the system. Thus, the system could operate in a distributed manner.

Also disclosed herein are non-transitory computer readable media with stored instructions. The instructions could be executable by a computing device to cause the computing device to perform functions similar to those described in the aforementioned methods.

Those skilled in the art will understand that there are many different specific methods and systems that could be used in converting, in a balloon, first electrical energy into kinetic mechanical energy that could be related to a rotational motion of a flywheel battery that rotates about a spin axis substantially parallel to the ground surface of the earth, storing the kinetic mechanical energy, and performing at least one of: i) converting the kinetic energy into second electrical energy, ii) stabilizing at least one motion of the balloon, and iii) rotating the balloon substantially about a balloon axis. Each of these specific methods and systems are contemplated herein, and several example embodiments are described below.

2. Example Systems

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

2b) Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

2c) Control of Balloons in a Balloon Network

Figure 2:
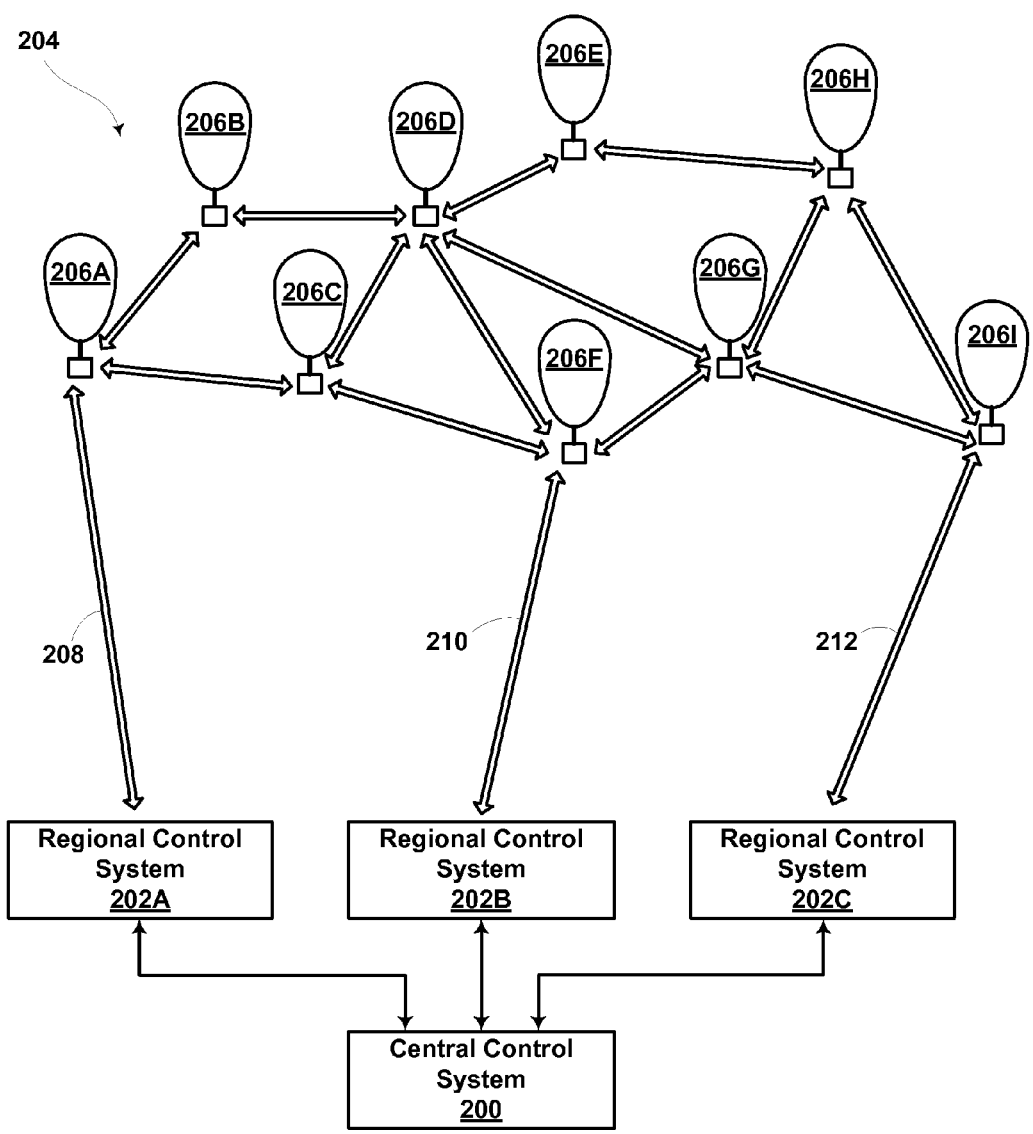
FIG. 2 is a block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 208, 210, and 212, respectively.

In the illustrated configuration, only some of balloons 206A to 206I are configured as downlink balloons. The balloons 206A, 206F, and 206I that are configured as downlink balloons may relay communications from central control system 200 to other balloons in the balloon network, such as balloons 206B to 206E, 206G, and 206H. However, it should be understood that in some implementations, it is possible that all balloons may function as downlink balloons. Further, while FIG. 2 shows multiple balloons configured as downlink balloons, it is also possible for a balloon network to include only one downlink balloon, or possibly even no downlink balloons.

Note that a regional control system 202A to 202C may in fact just be a particular type of ground-based station that is configured to communicate with downlink balloons (e.g., such as ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. Of course, a distributed-control arrangement may be useful in other scenarios as well.

Further, it should be understood that other control-system arrangements are also possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_j$, wherein $d_j$ is proportional to the distance to the second nearest neighbor balloon, for instance. Other algorithms for assigning force magnitudes for respective balloons in a mesh network are possible.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

2d) Example Balloon Configuration

Figure 3:
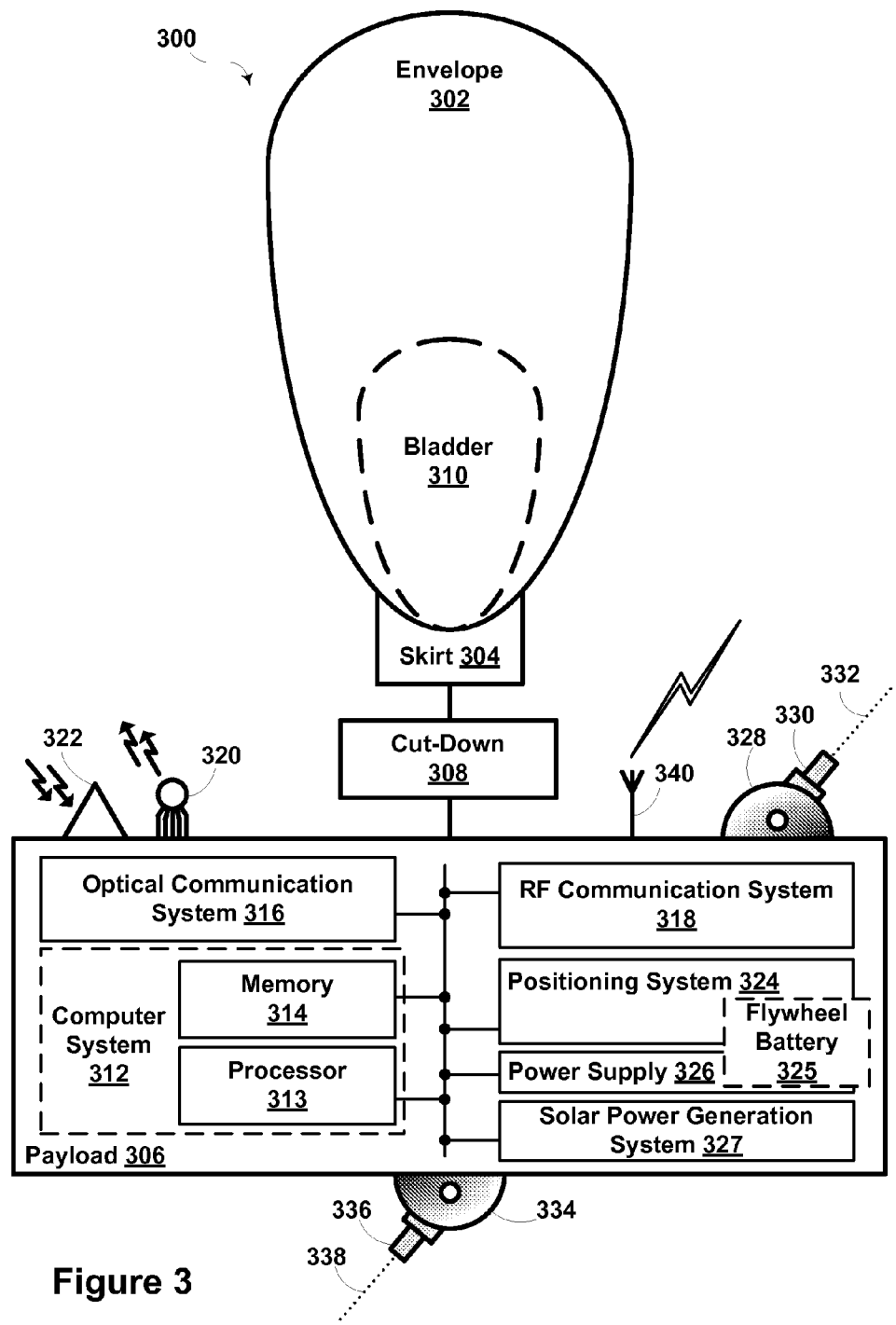
FIG. 3 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 18 km and 25 km. FIG. 3 shows a high-altitude balloon 300, according to an example embodiment. As shown, the balloon 300 includes an envelope 302, a skirt 304, a payload 306, and a cut-down system 308, which is attached between the balloon 302 and payload 306.

The envelope 302 and skirt 304 may take various forms, which may be currently well-known or yet to be developed. For instance, the envelope 302 and/or skirt 304 may be made of materials including metalized Mylar or BoPet. Additionally or alternatively, some or all of the envelope 302 and/or skirt 304 may be constructed from a highly-flexible latex material or a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 313 and on-board data storage, such as memory 314. The memory 314 may take the form of or include a non-transitory computer-readable medium. The non-transitory computer-readable medium may have instructions stored thereon, which can be accessed and executed by the processor 313 in order to carry out the balloon functions described herein. Thus, processor 313, in conjunction with instructions stored in memory 314, and/or other components, may function as a computer system 312 and further as a controller of balloon 300.

The payload 306 of balloon 300 may also include various other types of equipment and systems to provide a number of different functions. For example, payload 306 may include an optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses).

The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun.

Further, a balloon 300 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

Within the context of the disclosure, a flywheel battery 325 could be included in the payload 306. The flywheel battery 325 could include a battery configured to rotate about a spin axis. In some embodiments, the flywheel battery 325 could be housed inside the payload 306. Furthermore, the center of mass of the flywheel battery 325 could optionally be located based on a balloon axis that passes substantially through the center of mass of the balloon 300 and perpendicular to the ground surface of the earth (e.g., the center of mass of the flywheel battery 325 could be designed to substantially coincide with the balloon axis). In other embodiments, the center of mass of the flywheel battery 325 need not necessarily coincide with the balloon axis. Other ways of physically incorporating the flywheel battery 325 with the balloon 300 are possible.

The battery could include one or more rechargeable (secondary) batteries and/or disposable (primary) batteries. The battery could include various battery material compositions including, but not limited to, lead-acid, nickel-cadmium, nickel-metal-hydride, lithium-ion, lithium-polymer, lithium-sulfur, sodium-sulfur, alkaline, or other battery material compositions. The flywheel battery 325 could include wet cells, dry cells, or any other type of battery configured to convert chemical energy to electrical energy. The flywheel battery 325 could include a plurality of batteries of the same type or of different types. In some embodiments, the flywheel battery 325 could include one or more capacitors operable to supply electrical energy with, or without, the one or more batteries.

The battery type (e.g., primary or secondary), material composition, and/or other aspects of the battery (e.g., size, shape, and/or weight distribution) could be configured based on safety and reliability considerations. For example, due to the mechanical stresses that may be induced by spinning the battery, the composition of the battery could include materials that have a relatively greater mechanical strength and/or stability compared to other materials. Such mechanical stresses could lead to battery failure (e.g., the battery will become inoperable). Furthermore, the angular acceleration and/or angular velocity of the flywheel battery 325 could be limited so as to remain within safe-operating parameters. For example, the flywheel battery 325 could include a limiter that may control the angular velocity to remain below a maximum safe angular velocity (e.g., 1000 revolutions per second). Other maximum safe angular velocities are possible. Other types of limiters could limit various aspects of the operation of the flywheel battery 325. For instance, an angular acceleration limiter could control the flywheel battery 325 such that the angular acceleration of the flywheel battery 325 stays below a specified safety limit.

In some embodiments, the flywheel battery 325 could additionally include a housing. The housing may be configured to improve the safety of the system. For example, in the event of a failure of the flywheel battery 325, the housing may be operable to prevent debris from leaving the housing. As such, the housing could include Kevlar or other ballistic fabrics. Other housing materials are possible.

The flywheel battery 325 could be coupled to the payload 306 so as to provide at least a portion of the electrical energy to the payload 306. Such coupling between the flywheel battery 325 and the payload 306 could be one of, or any combination of, a conductive coupling (e.g., using one or more brushes), an inductive coupling, and a capacitive coupling. In other embodiments, the flywheel battery 325 could be coupled to the payload using a brushless-type coupling. Other ways of coupling the flywheel battery 325 and the payload 306 to provide a path for electrical energy are possible within the scope of the present disclosure.

The flywheel battery 325 could be rotated about the spin axis at a predetermined or otherwise specific angular velocity. Further, based on a known weight distribution and total weight of the flywheel battery 325 rotating at a given angular velocity, an angular momentum of the flywheel battery 325 could be determined. Based on the angular momentum, position corrections and/or stabilizations of the balloon 300 could be provided by changing the spin axis of the flywheel battery 325. Other configurations and uses of the flywheel battery 325 are possible.

The flywheel battery 325 could be mechanically coupled to a gimbal mount that could be mechanically coupled to the balloon 300. In some embodiments, the gimbal mount may be operable to change the orientation of the flywheel battery 325. In particular, the spin axis of the flywheel could be reoriented with respect to the balloon 300 using the gimbal mount. In an example embodiment, the gimbal mount could include support mounts that could allow multiple degrees of freedom for the spin axis of the flywheel battery 325. Further, the gimbal mount could include other mechanisms operable to move and/or maintain the spin axis of the flywheel battery 325. Moving or maintaining the spin axis could provide a gyroscopic torque to that could be used to stabilize or move the balloon 300.

The flywheel battery 325 could be configured to interact with at least the positioning system 324 and the power supply 326. For instance, in order to stabilize and/or move the balloon 300, the positioning system 324 could control at least the mechanical functions of the flywheel battery 325. Further, the flywheel battery 325 could interact with the power supply 326 in order, for instance, to provide electrical energy to at least one subsystem of the balloon 300. Interactions between the flywheel battery 325 and other subsystems of the balloon 300 are possible.

2e) Example Heterogeneous Network

In some embodiments, a high-altitude-balloon network may include super-node balloons, which communicate with one another via optical links, as well as sub-node balloons, which communicate with super-node balloons via RF links. Generally, the optical links between super-node balloons may be configured to have more bandwidth than the RF links between super-node and sub-node balloons. As such, the super-node balloons may function as the backbone of the balloon network, while the sub-nodes may provide sub-networks providing access to the balloon network and/or connecting the balloon network to other networks.

Figure 4:
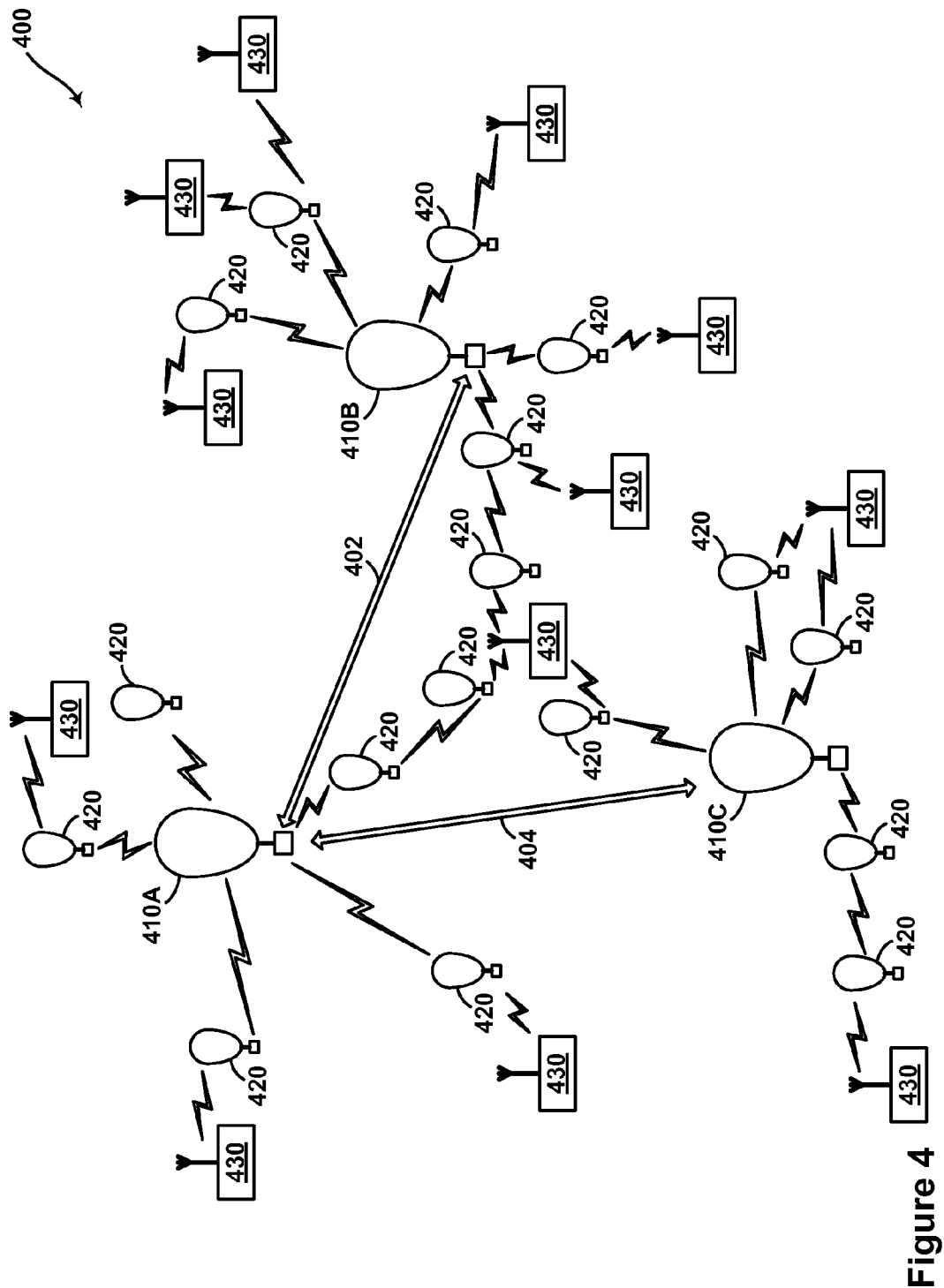
FIG. 4 is a simplified block diagram illustrating a balloon network that includes super-nodes and sub-nodes, according to an example embodiment.

FIG. 4 is a simplified block diagram illustrating a balloon network that includes super-nodes and sub-nodes, according to an example embodiment. More specifically, FIG. 4 illustrates a portion of a balloon network 400 that includes super-node balloons 410A to 410C (which may also be referred to as "super-nodes") and sub-node balloons 420 (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 410B may communicate with one another over optical link 402, and super-node 410A and super-node 410C may communicate with one another over optical link 404.

Each of the sub-node balloons 420 may include a radio-frequency (RF) communication system that is operable for packet-data communication over one or more RF air interfaces. Accordingly, each super-node balloon 410A to 410C may include an RF communication system that is operable to route packet data to one or more nearby sub-node balloons 420. When a sub-node 420 receives packet data from a super-node 410, the sub-node 420 may use its RF communication system to route the packet data to a ground-based station 430 via an RF air interface.

As noted above, the super-nodes 410A to 410C may be configured for both longer-range optical communication with other super-nodes and shorter-range RF communications with nearby sub-nodes 420. For example, super-nodes 410A to 410C may use using high-power or ultra-bright LEDs to transmit optical signals over optical links 402, 404, which may extend for as much as 100 miles, or possibly more. Configured as such, the super-nodes 410A to 410C may be capable of optical communications at data rates of 10 to 50 GBit/sec or more.

A larger number of high-altitude balloons may then be configured as sub-nodes, which may communicate with ground-based Internet nodes at data rates on the order of approximately 10 MBit/sec. For instance, in the illustrated implementation, the sub-nodes 420 may be configured to connect the super-nodes 410 to other networks and/or directly to client devices.

Note that the data speeds and link distances described in the above example and elsewhere herein are provided for illustrative purposes and should not be considered limiting; other data speeds and link distances are possible.

In some embodiments, the super-nodes 410A to 410C may function as a core network, while the sub-nodes 420 function as one or more access networks to the core network. In such an embodiment, some or all of the sub-nodes 420 may also function as gateways to the balloon network 400. Additionally or alternatively, some or all of ground-based stations 430 may function as gateways to the balloon network 400.

Within the context of the present disclosure, any of the example systems described herein could be operable to rotate a flywheel battery at a predetermined angular velocity about a spin axis. The flywheel battery could be mechanically and electrically coupled to a device, such as a balloon in a high-altitude balloon network. The flywheel battery could be configured to: i) be charged with electrical energy; ii) store at least a first portion of the electrical energy; and iii) provide at least a second portion of the electrical energy to at least a portion of the device. Changing the spin axis of the flywheel battery could generate a gyroscopic torque, which could be used to move or stabilize the device. Several specific example implementations are described in further detail below.

3. Example Implementations

Several example implementations will now be described herein. It will be understood that there are many ways to implement the devices, systems, and methods disclosed herein. Accordingly, the following examples are not intended to limit the scope of the present disclosure.

Figure 5A:
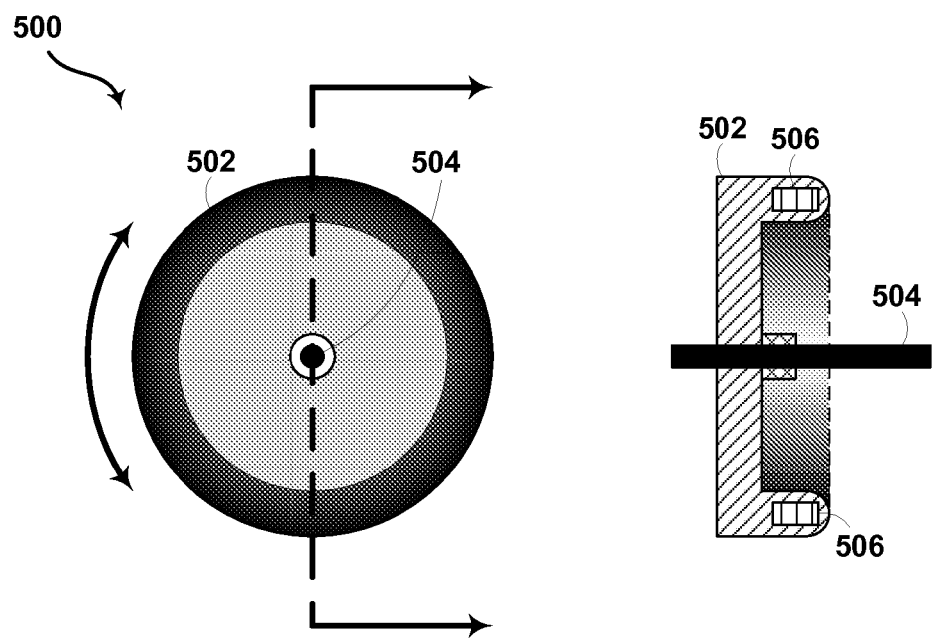
FIG. 5A illustrates a flywheel battery, according to an example embodiment.

FIG. 5A illustrates a flywheel battery 500. The flywheel battery 500 could include a rotor 502 and a shaft 504. The shaft 504 could be mechanically coupled to the rotor 502 and pass substantially through a central axis of the rotor 502. The flywheel battery 500 could additionally include at least one battery 506. The battery 506 could be a lithium-ion battery, a nickel-metal-hydride battery, or any other type or composition of an electrical energy storage device. The battery 506 could be incorporated within, or otherwise attached to, the rotor 502. In other embodiments, the rotor 502 could substantially consist of the battery 506.

The flywheel battery 500 could be configured to rotate about a spin axis. The spin axis could coincide with the central axis of the rotor 502 and the axis of the shaft 504.

Figure 5B:
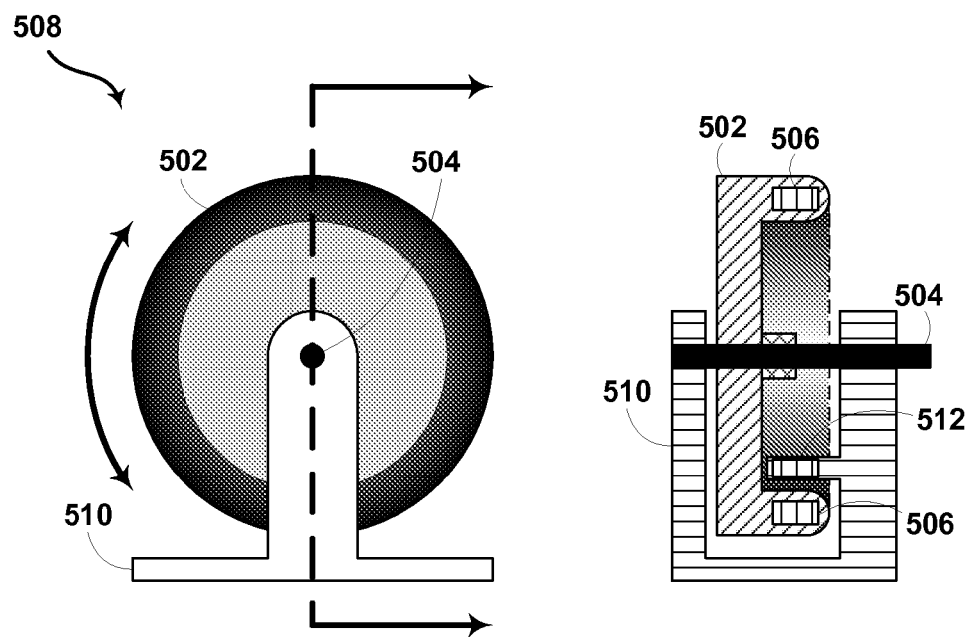
FIG. 5B illustrates a flywheel battery, according to an example embodiment.

FIG. 5B illustrates a flywheel battery 508. The flywheel battery 508 could include a rotor 502, a shaft 504, and a battery 506 as described in reference to FIG. 5A. The flywheel battery 508 could be mechanically coupled to a mount 510. In one embodiment, the shaft 504 could be attached to the mount 510 using magnetic bearings at one or more locations along the shaft 504. Other means of attaching the flywheel battery 508 to the mount 510 are possible, such as bushings, mechanical bearings, and/or fluid bearings.

The mount 510 could include at least one stator 512 that could be configured to provide a way to move electrical energy between the battery 506 and the stator 512. In other words, the stator 512 could provide a conductive and/or inductive current path for electrical current to flow to, or from, battery 506. The mount 510 could be mechanically coupled to a device, such as a balloon in a high-altitude balloon network. Other devices are possible.

Alternatively or additionally, the stator 512 could be part of an electric generator that could convert the rotational mechanical energy of the flywheel battery 508 into electrical energy.

In other embodiments, the at least one stator 512 could be coupled to an electric motor operable to convert electrical energy into the rotational mechanical energy of the flywheel battery 508. In such cases, the stator 512 could act to rotate the flywheel battery 508 at a predetermined angular velocity.

In yet other embodiments, the at least one stator 512 could be coupled to an electromagnetic-mechanical conversion device that could perform functions related to at least an electric generator and an electric motor. For example, the conversion device could be similar to those used in some hybrid automobiles to convert electrical energy to mechanical energy in order to provide driving functions while also offering recovery of electrical energy when braking. Other types of electromagnetic-mechanical conversions are possible within the context of the disclosure.

Figure 5C:
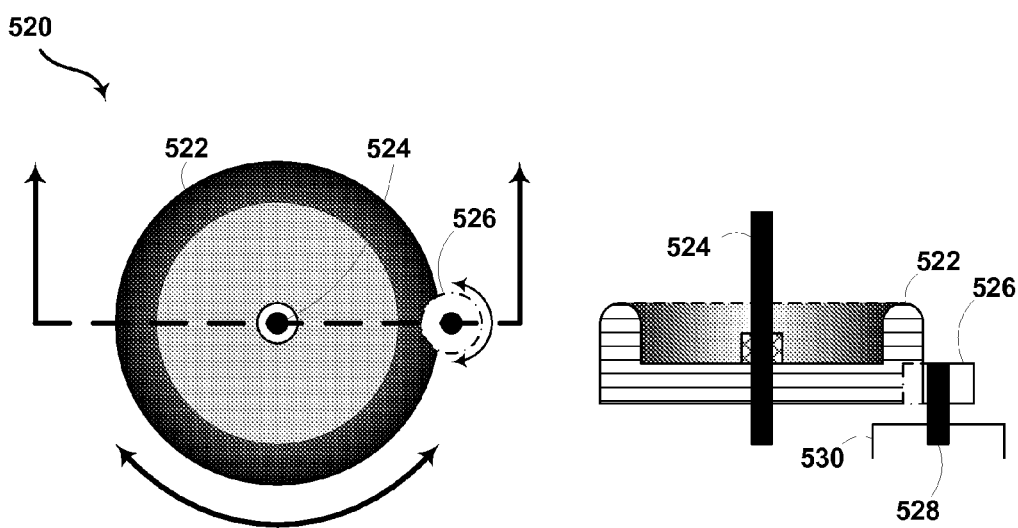
FIG. 5C illustrates a flywheel battery, according to an example embodiment.

FIG. 5C illustrates a flywheel battery 520. The flywheel battery 520 could include a rotor 522, a shaft 524, and a friction wheel/gear 526. The friction wheel/gear 526 could be mechanically coupled to a gear shaft 528 and a generator 530. Flywheel battery 520 could be operable to convert the kinetic mechanical energy of the rotation of the rotor 522 into electrical energy by causing the friction wheel/gear 526 to rotate, which may rotate the gear shaft 528. In such embodiments, the generator 530 could be operable to generate electrical energy.

In another embodiment, the generator 530 could be used as a motor such that the gear shaft 528 and the friction wheel/gear 526 are driven principally by the generator 530. In such a way, the friction wheel/gear 526 could engage the rotor 522 of the flywheel battery 520 so as to rotate the rotor 522 at a predetermined angular velocity.

Figure 6A:
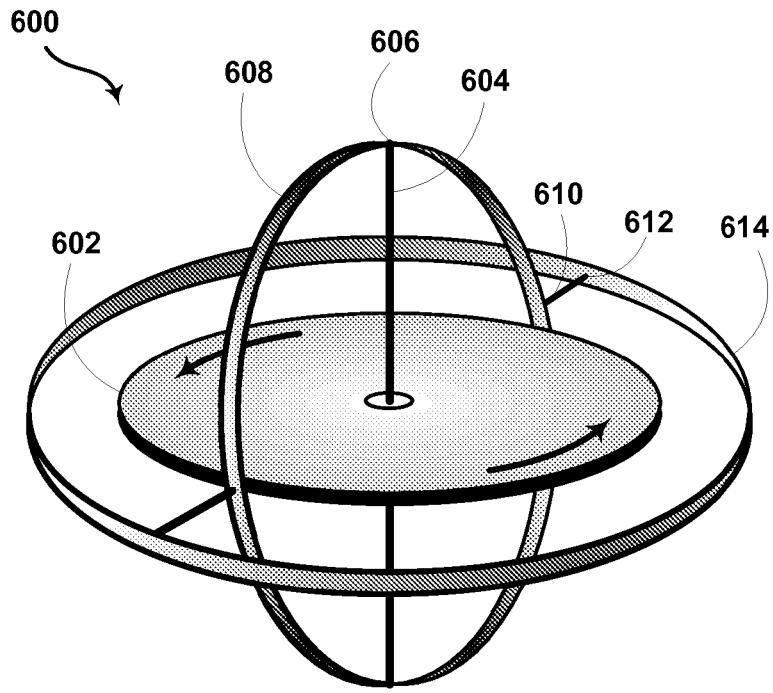
FIG. 6A illustrates a flywheel battery, according to an example embodiment.

FIG. 6A illustrates a flywheel battery 600. The flywheel battery 600 could include a rotor 602, a shaft 604, an inside gimbal coupling 606, an inside gimbal frame 608, an inside gimbal shaft 610, an outside gimbal coupling 612, and an outside gimbal frame 614. The gimbal could be operable to tilt the shaft 604 so as to generate a gyroscopic torque. The direction and magnitude of the gyroscope torque could depend on the tilt angle and tilt rate away from the spin axis. If the flywheel battery 600 is mechanically coupled to a device, such as a balloon in a high-altitude balloon network, the gyroscopic torque could be used to rotate or stabilize the balloon.

Figure 6B:
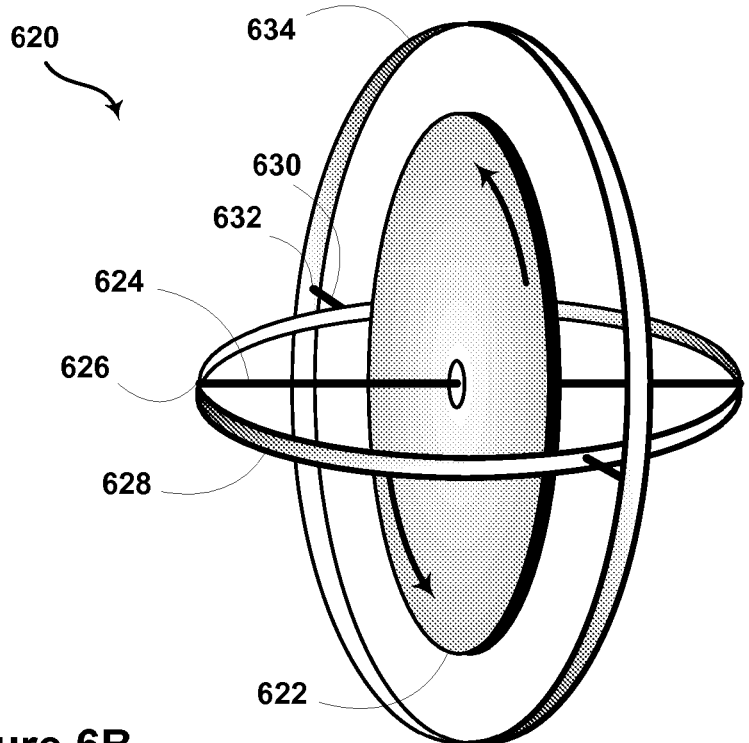
FIG. 6B illustrates a flywheel battery, according to an example embodiment.

FIG. 6B illustrates a flywheel battery 620. In this case, flywheel battery 620 could be configured to rotate in a substantially vertical plane. The flywheel battery 620 could include a rotor 622, a shaft 624, an inside gimbal coupling 626, an inside gimbal frame 628, an inside gimbal shaft 630, an outside gimbal coupling 632, and an outside gimbal frame 634.

Figure 6C:
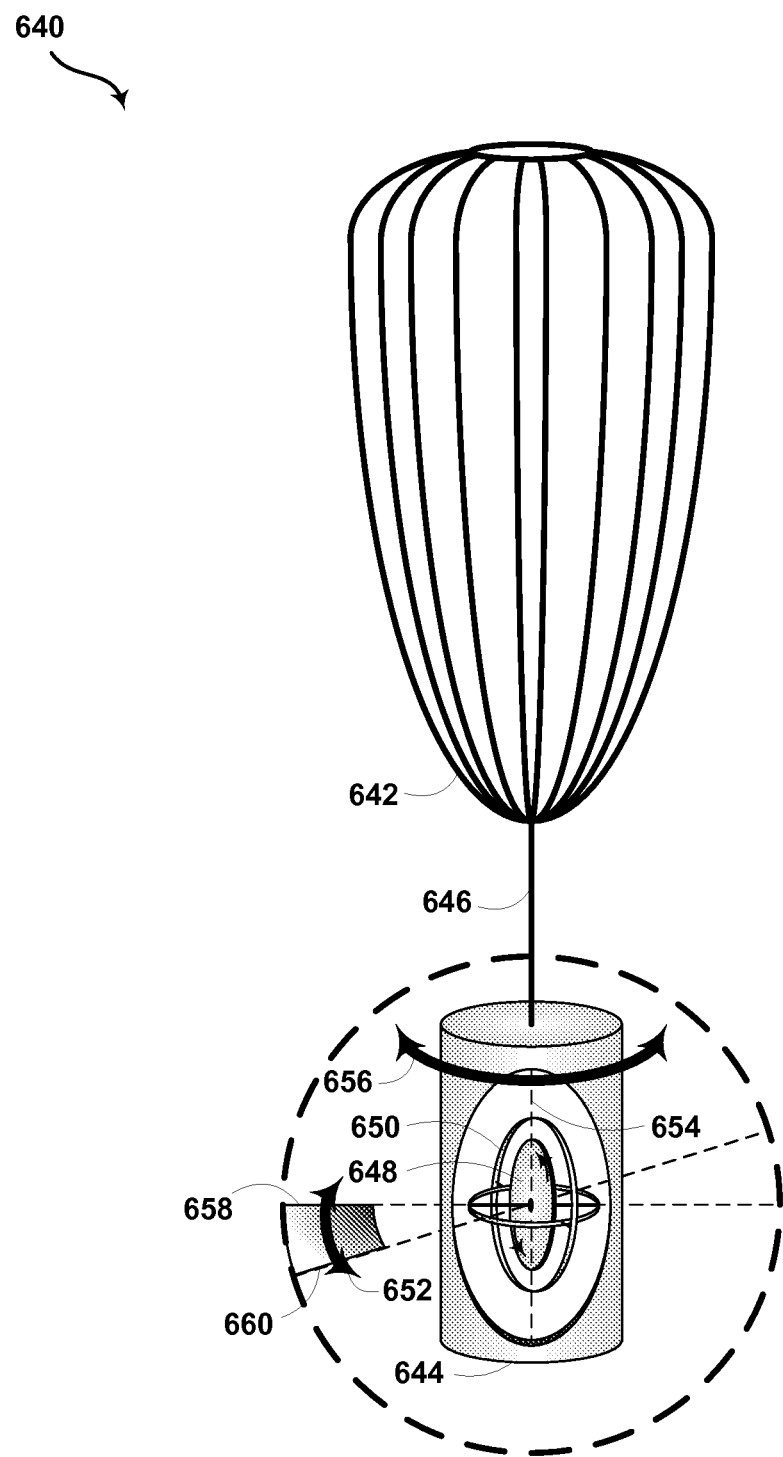
FIG. 6C illustrates a flywheel battery and balloon operating scenario, according to an example embodiment.

FIG. 6C illustrates an operating scenario 640 that includes a flywheel battery and a balloon. The balloon could include an envelope 642, a cord 646, and a payload 644. The payload 644 could include a flywheel battery among other subsystems and components. The flywheel battery could include a rotor 648, and a gimbal mount 650. In the operating scenario 640, the rotor 648 could be rotated at a predetermined angular velocity about a first spin axis 658. Such rotation of the rotor 648 could generate a moment of inertia.

In some embodiments, it may be important to stabilize the position and/or the orientation of the payload. For example, if the balloon is in a high-altitude balloon network, optical communications equipment may be utilized to form an optical communications link. The optical communications equipment must be sufficiently aligned between receiver and sender so as to maintain the optical communications link. Thus, it may be useful to include a means for maintaining a payload position and/or payload orientation.

The flywheel battery could be operable to provide such position and stability control. For example, by applying a spin axis tilt 652 from the first spin axis 658 to the second spin axis 660 (e.g., changing the spin axis by inclining/declining it with respect to the surface of the earth), a reaction torque could be generated in response to the change in spin axis. The result could include a payload rotation 656. The payload rotation could occur about the balloon axis 654, which could be substantially vertical with respect to the surface of the earth. In the illustrated case, the reaction torque could cause the balloon to rotate counter-clockwise when viewed from above.

In other words, in response to a spin axis change, the flywheel battery could precess like a gyroscope. Such precessing movements could induce reaction torques that could be used to rotate the balloon payload 644. Other movements or stabilizations of the balloon could be possible depending upon the angle and rate of change of the spin axis tilt 652. Thus, the flywheel battery could be similar or identical to a control moment gyroscope (CMG), which can be used to stabilize spacecraft and/or maintain a specific heading or position.

4. Example Methods

Several example methods will now be described herein. It will be understood that there are many methods that could utilize the devices and systems disclosed herein. Accordingly, the following examples are not intended to limit the scope of the present disclosure.

Figure 7:
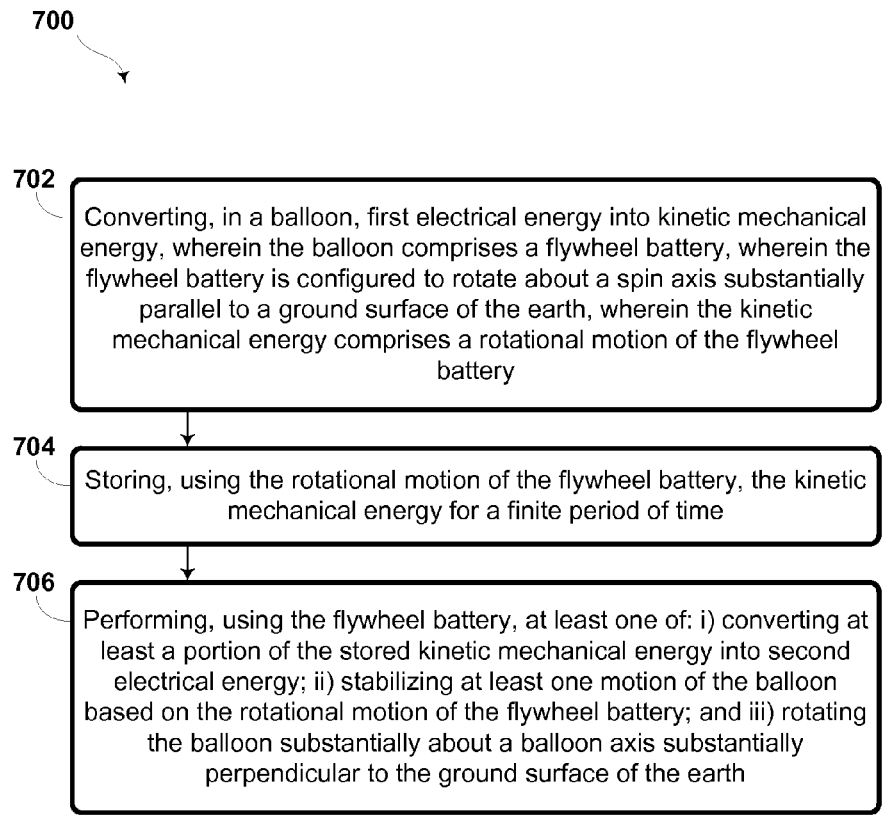
FIG. 7 is a flowchart illustrating a method, according to an example embodiment.

A method 700 is provided for converting, in a balloon, first electrical energy into kinetic mechanical energy that could be related to a rotational motion of a flywheel battery that rotates about a spin axis substantially parallel to the ground surface of the earth, storing the kinetic mechanical energy, and performing at least one of: i) converting the kinetic energy into second electrical energy, ii) stabilizing at least one motion of the balloon, and iii) rotating the balloon substantially about a balloon axis. The method could be performed using any of the apparatus shown and described in reference to FIGS. 1-6C, however, other configurations could be used. FIG. 7 illustrates the steps in an example method, however, it is understood that in other embodiments, the steps may appear in different order and steps could be added or subtracted.

Step 702 includes converting, in a balloon, first electrical energy into kinetic mechanical energy. The balloon includes a flywheel battery configured to rotate about a spin axis substantially parallel to a ground surface of the earth. The kinetic mechanical energy includes a rotational motion of the flywheel battery.

The balloon could be the balloon 300 as described in reference to FIG. 3. Furthermore, the balloon could be in the balloon network 100 as described in reference to FIG. 1.

The first electrical energy could be supplied by at least one of, or any combination of, a battery, a capacitor, a solar panel, a generator, a dynamo, or another device configured to be a source of electrical energy. The first electrical energy could be converted into kinetic mechanical energy, using a means, such as an electric motor, to rotate the flywheel battery at a predetermined angular velocity. In other embodiments, the flywheel battery could be 'spun-up' from a stationary state or an angular velocity of the flywheel battery could be increased relative to a previous angular velocity of the flywheel battery. In yet other embodiments, the flywheel battery may be rotated at an angular velocity that represents an undetermined angular velocity. In other words, some embodiments may not include the flywheel battery rotating at a predetermined angular velocity, but rather at an undetermined and/or an uncontrolled angular velocity.

The spin axis could represent an axis that passes substantially perpendicularly through a center of mass of the flywheel battery. In an example embodiment, the flywheel battery could be substantially disk-shaped. In such a case, the spin axis could pass through the center of mass of the flywheel battery perpendicular to the plane of the battery disk. By rotating the flywheel battery about the spin axis, a moment of inertia may be generated.

Step 704 includes storing, using the rotational motion of the flywheel battery, the kinetic mechanical energy for a finite period of time. In an example embodiment, the flywheel battery could be spun up to a predetermined angular velocity while rotating about a spin axis. The rotational motion of the flywheel battery could be maintained for a period of time so as to store the kinetic mechanical energy. The period of time could range from seconds or minutes up through days and months. Shorter and longer periods of time are possible.

Step 706 includes performing, using the flywheel battery, at least one of: i) converting at least a portion of the stored kinetic mechanical energy into second electrical energy; ii) stabilizing at least one motion of the balloon based on the rotational motion of the flywheel battery; and iii) rotating the balloon substantially about a balloon axis substantially perpendicular to the ground surface of the earth.

In an example embodiment, first electrical energy could be obtained from a solar power source. The solar power source could be a solar cell. Some or all of the first electrical energy could be used to power a device (e.g., an electric motor) that may be operable to rotate the flywheel battery. In such an example, the first electrical energy may be transferred in part or in full to kinetic mechanical energy that includes rotational motion of the flywheel battery. While the solar power source is partially or completely unavailable (e.g., due to cloudy or night time conditions), the stored kinetic mechanical energy from the flywheel battery could be stored. The flywheel battery could also store kinetic mechanical energy at any other time as well. Furthermore, in an effort to power some or all of the balloon subsystems, some or all of the kinetic mechanical energy stored in the rotational motion of the flywheel battery may be converted to electrical energy using an electric generator.

The electrical generator could include a shaft with a gear or friction wheel configured to engage the flywheel battery. When the gear or friction wheel engages the flywheel battery, a shaft of the electrical generator could be rotated. In doing so, the electrical generator may convert a portion of the stored kinetic mechanical energy into the second electrical energy. Other means of converting the energy related to the rotation of the flywheel into electrical energy are possible.

The second electrical energy could be utilized in a number of different ways. For instance, the second electrical energy could be used to power at least one subsystem of the balloon. In another embodiment, the second electrical energy could be used to charge batteries located separate from the flywheel battery.

Stabilizing the balloon using the rotational motion of the flywheel battery could be performed in several ways. By spinning the flywheel battery, the balloon may resist motions due to a moment of inertia. For example, if the flywheel battery rotates about a spin axis parallel to the ground surface of the earth, the balloon may resist twisting motions about a balloon axis, which may extend perpendicular to the surface of the earth and through a center of mass of the balloon. The flywheel battery may exert gyroscopic torques on mechanically coupled parts (e.g., the rest of the balloon) so as to counteract forces in one or more directions and/or about one or more axes. The flywheel battery could act to stabilize the balloon for various reasons. For instance, if the balloon is in a high-altitude balloon network, free-space optical communication components may need to be pointed towards another balloon or at another ground-, air-, or space-based platform. Accordingly, the stabilizing action of the gyroscopic torques could reduce effects due to vibration, wind, etc.

Stabilizing the balloon using the rotational motion of the flywheel battery could be performed passively or actively. For example, a flywheel battery may be mechanically coupled to a balloon with a balloon axis. If the flywheel battery is rotated about a spin axis parallel to the ground surface of the earth and the center of mass of the flywheel battery substantially lies along the balloon axis, the flywheel battery may 'passively' stabilize balloon movements, especially rotational forces of the balloon about balloon axis.

In other embodiments, balloon stabilization could be performed dynamically. For example, assuming a flywheel battery and balloon as in the previous example, the spin axis could be rotated about the balloon axis (or any other axis) in order to actively stabilize translational or rotational forces on the balloon. In other words, the flywheel battery spin axis could be adjusted actively so as to maintain a particular balloon heading, orientation, or position.

The method could include rotating the balloon substantially about a balloon axis substantially perpendicular to the ground surface of the earth. In such an embodiment, a spin axis of the rotating flywheel battery could be tilted. Such a tilt of the spin axis could result in a gyroscopic torque on a mechanical mount of the flywheel battery. Such gyroscopic torques could be used to stabilize the balloon. For example, the flywheel battery could be rotating about a spin axis substantially parallel to the ground surface of the earth. A gimbal mount mechanically attached to the flywheel battery and the balloon could include a motor, a servo, or other mechanism configured to rotate at least a portion of the gimbal mount about the balloon axis, which could be an axis that may extend through the center of mass of the balloon and substantially perpendicular to the ground surface of the earth. By using the motor to rotate the gimbal mount with respect to the balloon, a gyroscopic torque could be induced in order to rotate the balloon about the balloon axis.

The rotation of the balloon about the balloon axis could be used to stabilize the balloon (maintain a particular orientation), to change the orientation of the balloon, or to move the balloon. Other balloon motions could be stabilized or moved using the flywheel battery. Additionally, free-space optical communication components could be fully or partially aligned using such movements. For instance, the optical components could be reoriented by rotating the balloon using the flywheel battery. In such cases, there may be a reduced need for the free-space optical communication components to make gross pointing adjustments.

Figure 8:
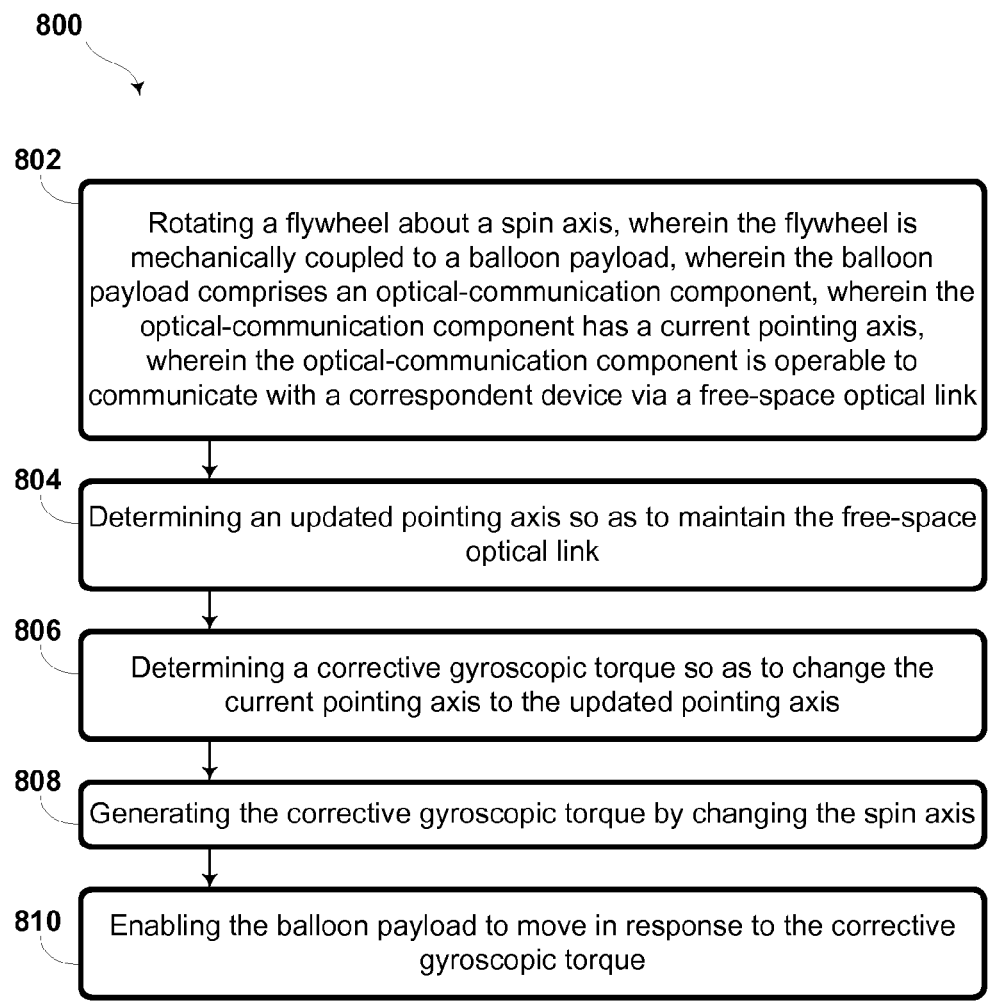
FIG. 8 is a flowchart illustrating a method, according to an example embodiment.

Another example method 800 is illustrated in FIG. 8. The method 800 includes rotating a flywheel about a spin axis. The flywheel is mechanically coupled to a balloon payload, which includes an optical-communication component. The optical-communication component has a current pointing axis and the optical-communication component is operable to communicate with a correspondent device via a free-space optical link. An updated pointing axis may be determined so as to maintain the free-space optical link. Furthermore, a corrective gyroscopic torque could be determined so as to change the current pointing axis to the updated pointing axis. The corrective gyroscopic torque may be generated by changing the spin axis and the balloon payload may be enabled to move in response to the corrective gyroscopic torque.

Step 802 could include rotating a flywheel about a spin axis. The flywheel is mechanically coupled to a balloon payload, which includes an optical-communication component. The optical-communication component has a current pointing axis, and the optical-communication component is operable to communicate with a correspondent device via a free-space optical link.

In some embodiments, the flywheel could be shaped as a disk. The spin axis could extend through the center of mass of the flywheel and be perpendicular to the plane of the flywheel disk. Other spin axes are possible.

The flywheel could be mechanically coupled to the balloon payload via a mount. In some embodiments, the mount could be a gimbal mount with one or more support frame members. The precise mechanical layout of the gimbal mount could vary widely, but it will be understood that the gimbal mount could be operable to allow the flywheel to rotate about the spin axis while the gimbal mount could act to reposition the spin axis relative to the balloon payload.

The optical-communication component could be an optical transmitter, an optical receiver, and/or an optical transceiver. Other types of optical-communication components are possible. The optical-communication component could have a current pointing axis, which may represent the direction in which the optical-communication component is oriented. The optical-communication component could be configured to communicate with other correspondent devices via a free-space optical link. The other correspondent devices could represent, for instance, another optical-communication component in: i) another balloon payload or ii) a ground- or space-based optical communication platform.

Step 804 includes determining an updated pointing axis so as to maintain the free-space optical link. In other words, the current pointing axis of the optical-communication component may be slightly misaligned with respect to the correspondent device. In order to maintain the free-space optical link, an updated pointing axis could be determined. The updated pointing axis could represent a fine angle correction for the optical-communication component or it could be a gross correction. The updated pointing axis could be determined using a positioning system (e.g., a GPS or an inertial navigation system). The updated pointing axis alternatively or additionally could be determined at least in part by using the optical-communication component and/or the correspondent device. In some embodiments, the updated pointing axis could be determined by a computer system on the balloon and/or a computer system located elsewhere. Other ways to determine the updated pointing axis are possible.

Step 806 includes determining a corrective gyroscopic torque so as to change the current pointing axis to the updated pointing axis. Put another way, the rotating flywheel includes an angular momentum. By changing a spin axis of the flywheel, gyroscopic torques could be applied to the balloon payload so as to move and/or rotate it. In moving the balloon by applying the corrective gyroscopic torque to the balloon payload, the current pointing axis could be adjusted to be the updated pointing axis of the optical-communication component. Thus, the free-space optical link could be maintained and/or optimized. The corrective gyroscopic torque could be determined by a system on the balloon. Alternatively, the corrective gyroscopic torque could be determined, in full or in part, by a computer system elsewhere.

Step 808 includes generating the corrective gyroscopic torque by changing the spin axis. In some embodiments, the flywheel could be attached to the balloon payload using a gimbal mount. The gimbal mount could include mechanisms by which a flywheel orientation could be changed with respect to a balloon payload orientation. By tilting the spin axis, a corrective gyroscopic torque could be induced on the gimbal mount of the flywheel.

Step 810 includes enabling the balloon payload to move in response to the corrective gyroscopic torque. Upon inducing the corrective gyroscopic torque by changing the spin axis, the corrective gyroscopic torque could be relieved by changing the orientation of the balloon payload with respect to its environment. In other words, the balloon payload could rotate, translate, or otherwise move within its environment in response to the corrective gyroscopic torque. Other movements of the balloon payload based on changing the spin axis of the flywheel are possible within the context of the disclosure.

Example methods, such as method 700 of FIG. 7 and method 800 of FIG. 8, may be carried out in whole or in part by one or more balloons and their respective subsystems. Accordingly, example methods could be described by way of example herein as being implemented by the balloon. However, it should be understood that an example method may be implemented in whole or in part by other computing devices. For example, an example method may be implemented in whole or in part by a server system, which receives data from the balloon or from elsewhere. Other examples of computing devices or combinations of computing devices that can implement an example method are possible.

Those skilled in the art will understand that there are other similar methods that could include rotating a battery at a predetermined angular velocity about a spin axis. The battery is mechanically and electrically coupled to a balloon payload. The battery is configured to: i) be charged with electrical energy; ii) store at least a first portion of the electrical energy; and iii) provide at least a second portion of the electrical energy to at least a portion of the balloon payload. Other methods could include using a flywheel to adjust a pointing axis of an optical-communication component of a balloon payload. In such similar methods, tilting the spin axis could generate a gyroscopic torque and the balloon payload could be moved or stabilized based on the gyroscopic torque. Those similar methods are implicitly contemplated herein.

Figure 9:
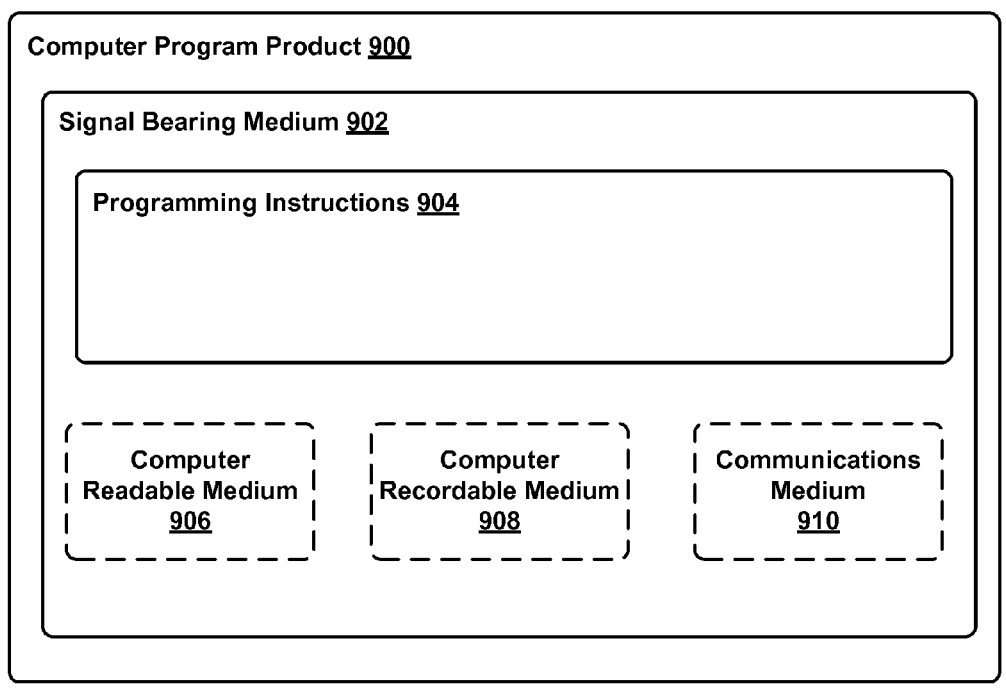
FIG. 9 is a schematic diagram of a computer program product, according to an example embodiment.

In some embodiments, the disclosed methods may be implemented as computer program instructions encoded on a non-transitory computer-readable storage media in a machine-readable format, or on other non-transitory media or articles of manufacture. FIG. 9 is a schematic illustrating a conceptual partial view of an example computer program product that includes a computer program for executing a computer process on a computing device, arranged according to at least some embodiments presented herein.

In one embodiment, the example computer program product 900 is provided using a signal bearing medium 902. The signal bearing medium 902 may include one or more programming instructions 904 that, when executed by one or more processors may provide functionality or portions of the functionality described above with respect to FIGS. 1-6C. In some examples, the signal bearing medium 902 may encompass a computer-readable medium 906, such as, but not limited to, a hard disk drive, a Compact Disc (CD), a Digital Video Disk (DVD), a digital tape, memory, etc. In some implementations, the signal bearing medium 902 may encompass a computer recordable medium 908, such as, but not limited to, memory, read/write (R/W) CDs, R/W DVDs, etc. In some implementations, the signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, the signal bearing medium 902 may be conveyed by a wireless form of the communications medium 910.

The one or more programming instructions 904 may be, for example, computer executable and/or logic implemented instructions. In some examples, a computing device such as the computer system 312 of FIG. 3 may be configured to provide various operations, functions, or actions in response to the programming instructions 904 conveyed to the computer system 312 by one or more of the computer readable medium 906, the computer recordable medium 908, and/or the communications medium 910.

The non-transitory computer readable medium could also be distributed among multiple data storage elements, which could be remotely located from each other. The computing device that executes some or all of the stored instructions could be a device, such as the balloon 300 shown and described in reference to FIG. 3. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:
    converting, in a balloon, first electrical energy into kinetic mechanical energy, wherein the balloon comprises a flywheel battery, wherein the flywheel battery is configured to rotate about a spin axis substantially parallel to a ground surface of the earth, wherein the kinetic mechanical energy comprises a rotational motion of the flywheel battery;
    storing, using the rotational motion of the flywheel battery, the kinetic mechanical energy for a finite period of time;
    performing, using the flywheel battery, at least one of:
        i) converting at least a portion of the stored kinetic mechanical energy into second electrical energy;
        ii) stabilizing at least one motion of the balloon based on the rotational motion of the flywheel battery;
        iii) rotating the balloon substantially about a balloon axis substantially perpendicular to the ground surface of the earth.

2. The method of claim 1, wherein the balloon is a balloon in a high-altitude balloon network.

3. The method of claim 1, wherein the flywheel battery comprises a lithium-ion battery.

4. The method of claim 1, wherein converting the first electrical energy into the kinetic mechanical energy comprises rotating the flywheel battery about the spin axis.

5. The method of claim 1, further comprising obtaining the first electrical energy from a solar power source.

6. The method of claim 5, wherein storing the kinetic mechanical energy for a finite period of time comprises storing the kinetic mechanical energy when the solar power source is unavailable.

7. The method of claim 1, wherein converting the at least a portion of the stored kinetic mechanical energy into the second electrical energy comprises using an electrical generator to convert the at least a portion of the stored kinetic mechanical energy into the second electrical energy.

8. The method of claim 1, wherein stabilizing the at least one motion of the balloon comprises stabilizing the at least one motion of the balloon substantially using angular momentum of the flywheel battery.

9. The method of claim 1, wherein the flywheel battery is in at least one gimbal mount and wherein rotating the balloon substantially about the balloon axis comprises changing the spin axis using the at least one gimbal mount.

10. A flywheel battery, comprising:
    a shaft defining a spin axis;
    a rotor mechanically coupled to the shaft, wherein the rotor is configured to rotate about the spin axis, wherein the rotor comprises at least one battery configured to store electrical energy, wherein the rotation of the rotor about the spin axis comprises kinetic mechanical energy; and
    a mount mechanically coupled to a balloon, wherein the mount comprises at least one stator, wherein the at least one battery is configured to provide electrical power to at least one sub-system of the balloon.

11. The flywheel battery of claim 10, wherein the balloon is in a high-altitude balloon network.

12. The flywheel battery of claim 10, wherein the at least one battery comprises a lithium-ion battery.

13. The flywheel battery of claim 10, further comprising an electric motor, wherein the electric motor is configured to convert first electrical energy into the kinetic mechanical energy.

14. The flywheel battery of claim 10, further comprising an electric generator, wherein the electric generator is configured to convert the kinetic mechanical energy into second electrical energy.

15. The flywheel battery of claim 10, wherein the mount comprises a gimbal mount.

16. The flywheel battery of claim 15, wherein the gimbal mount is operable to change the spin axis of the flywheel battery.

17. A non-transitory computer readable medium having stored therein instructions executable by a computing device to cause the computing device to perform functions comprising:
    causing a system to convert, in a balloon, first electrical energy into kinetic mechanical energy, wherein the balloon comprises a flywheel battery, wherein the flywheel battery is configured to rotate about a spin axis substantially parallel to a ground surface of the earth, wherein the kinetic mechanical energy comprises a rotational motion of the flywheel battery;
    causing the flywheel battery to store, using the rotational motion of the flywheel battery, the kinetic mechanical energy for a finite period of time;
    causing the flywheel battery to perform at least one of:
        i) converting at least a portion of the stored kinetic mechanical energy into second electrical energy;
        ii) stabilizing at least one motion of the balloon based on the rotational motion of the flywheel battery;
        iii) rotating the balloon substantially about a balloon axis substantially perpendicular to the ground surface of the earth.

18. The non-transitory computer readable medium of claim 17, wherein converting the first electrical energy into the kinetic mechanical energy comprises rotating the flywheel battery about the spin axis at a predetermined angular velocity.

19. The non-transitory computer readable medium of claim 17, wherein the flywheel battery is configured to store at least a portion of the first electrical energy, and wherein converting the first electrical energy into the kinetic mechanical energy comprises the flywheel battery supplying at least the portion of the first electrical energy to rotate the flywheel battery at the predetermined angular velocity.

20. A method, comprising:
    rotating a flywheel about a spin axis, wherein the flywheel is mechanically coupled to a balloon payload, wherein the balloon payload comprises an optical-communication component, wherein the optical-communication component has a current pointing axis, wherein the optical-communication component is operable to communicate with a correspondent device via a free-space optical link;

determining an updated pointing axis so as to maintain the free-space optical link;

determining a corrective gyroscopic torque so as change the current pointing axis to the updated pointing axis;

generating the corrective gyroscopic torque by changing the spin axis; and enabling the balloon payload to move in response to the corrective gyroscopic torque.

21. The method of claim 20, wherein the balloon payload is in a high-altitude balloon network.

22. The method of claim 20, wherein the flywheel comprises a battery.

23. A device, comprising:
a mount; and
a battery mechanically coupled to the mount, such that the battery is configured to rotate about a spin axis, wherein the battery is configured to store electrical energy, wherein the battery is electrically coupled to at least one sub-system of a balloon, wherein the battery is configured to provide at least a portion of the electrical energy to the at least one sub-system of the balloon.

24. The device of claim 23, wherein the battery comprises a lithium-ion battery.

25. The device of claim 23, wherein the mount comprises a gimbal mount, wherein the gimbal mount is operable to change the spin axis so as to generate a gyroscopic torque.

26. The device of claim 25, wherein the gimbal mount is mechanically coupled to a balloon, wherein the balloon is configured to rotate about a balloon axis in response to the gyroscopic torque, wherein the balloon axis is substantially perpendicular to a surface of the earth.

* * * * *